June 13, 1939.  W. KAUTTER  2,162,470

REGENERATIVE CIRCUIT ARRANGEMENT

Filed Feb. 26, 1937

INVENTOR
WOLFGANG KAUTTER
BY
ATTORNEY

UNITED STATES PATENT OFFICE 2,162,470

REGENERATIVE CIRCUIT ARRANGEMENT

Wolfgang Kautter, Berlin, Germany, assignor to Telefunken Gesellschaft für Drahtlose Telegraphie m. b. H., Berlin, Germany, a corporation of Germany Application February 26, 1937, Serial No. 127,846
In Germany February 26, 1936

5 Claims. (Cl. 250—27)

This invention relates to a regenerative circuit arrangement for transmitters and receivers with tapped oscillation-circuit coil, and is a continuation in part to United States patent application Serial No. 32,326, filed July 20, 1935.

The parent patent application is concerned with a regenerative circuit organization comprising a tapped coil in the grid circuit or the plate circuit. Such a regenerative circuit organization is usable not only in transmitter schemes for the production of oscillations, but also in receivers for deattenuation or regeneration. In the regeneratively connected grid detector, loose coupling of the tube with the oscillation circuit results in lower damping being caused in the oscillation circuit by the grid current, and particularly with long waves a smoother or softer start of the oscillations.

The object of the parent patent application is the avoidance of stray or disturbing oscillations by choosing the coupling of the tickler coil in such a fashion that the stray oscillations are either not fed back or that they are subject to degeneration.

Figure 1:
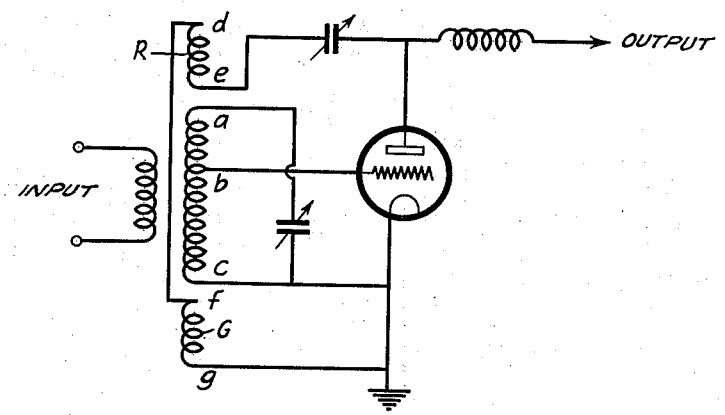

By way of example, a scheme which is cited in the parent patent consists in coupling the tickler coil with the free end of the tapped oscillation circuit. In Fig. 1, of the accompanying drawing, the coil portion bc, together with the grid-filament path, constitutes the disturbance oscillation circuit.

Figure 2:
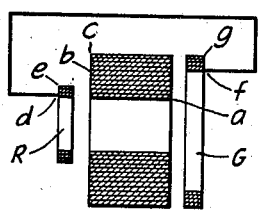

Fig. 2 represents the coils of Fig. 1 with the same indications. Coil C is wound in several layers so that coil R is coupled to the inner incipient windings and coil G is coupled to the outer windings.

It has been discovered that this measure is not sufficient in some cases because the portion of the oscillation-circuit coil lying below the tapping still forms with the tube capacitance a disturbance oscillation circuit not taken care of in the parent patent.

Hence, in addition to the tickler coil, there is provided according to the invention an anti-regeneration (or negative regeneration) coil acting upon the portion of the oscillation-circuit coil which forms a disturbance oscillation circuit with the tube capacitance.

Referring to Fig. 1, which is an exemplified embodiment, R denotes the tickler coil properly so-called, while G is the anti-regeneration coil. The latter acts upon the lower end of the oscillation circuit which constitutes the source of the stray waves. In the case of oscillators, the production of stray oscillations is thus prevented, while where used for regeneration in amplifiers, premature oscillating of the grid detector at the frequency of the stray oscillation upon increasing the feedback is prevented as long as regeneration has not been used far enough for the useful frequency.

Fig. 2 shows the structural arrangement of the coils as used in practice. The middle coil is the grid coil, the one on the left-hand side is the tickler coil, and the right one is the degeneration coil. The beginnings and the ends of the coils are designated similarly in both figures.

What is claimed is:

1. A regenerative circuit arrangement for radio waves comprising an electron discharge device having at least an anode, grid, and cathode, an oscillation circuit, a regenerative coil coupled to said oscillation circuit, an anti-regenerative coil coupled to said oscillation circuit, a tapped portion on said oscillation circuit, said tapped portion being connected to the grid and cathode of said electron discharge device, said regenerative coil and anti-regenerative coil being connected together in series with the plate and cathode of said electron discharge device.

2. A regenerative circuit arrangement for high frequency waves comprising an electron discharge device having at least an anode, grid and cathode, an oscillation circuit comprising an inductance coil having a tapped portion, a regenerative coil coupled to the upper portion of the inductance coil of said oscillation circuit, an anti-regenerative coil coupled to the lower portion of the inductance coil of said oscillation circuit, a variable tuning condenser connected across the ends of said inductance coil, said tapped portion being connected to the grid and cathode of said electron discharge device, said regenerative coil and anti-regenerative coil being connected together in series with the plate and cathode of said electron discharge device.

3. A regenerative circuit arrangement for radio waves comprising an electron discharge device having at least an anode, grid and cathode, an oscillation circuit, a regenerative coil coupled to said oscillation circuit comprising an inductance coil having a tapped portion, said inductance coil being wound in layers, an anti-regenerative coil coupled to the lower portion of the inductance coil of said oscillation circuit, a variable tuning condenser connected across the ends of said inductance coil, said tapped portion of said inductance coil being connected to the grid and cathode of said electron discharge device, the lower end of said inductance coil connected to said cathode, said regenerative coil and anti-regenerative coil being connected together in series with the plate and cathode of said electron discharge device.

4. A regenerative circuit arrangement for radio waves comprising an electron discharge device having at least an anode, grid and cathode, an oscillation circuit including a coil having a tapped portion, a regenerative coil coupled to said oscillation circuit, an anti-regenerative coil coupled to said oscillation circuit, said tapped portion on said coil being connected to the grid and cathode of said electron discharge device, said regenerative coil and anti-regenerative coil being connected together in series with the plate and cathode of said electron discharge device.

5. A regenerative circuit arrangement for radio waves comprising an electron discharge device having at least an anode, grid and cathode, an oscillation circuit including a tapped coil, a regenerative coil coupled to said oscillation circuit, and an anti-regenerative coil coupled to said oscillation circuit, a tapped portion on said coil being connected to the grid and cathode of said electron discharge device, said regenerative coil being located on one side of said oscillation circuit coil, said anti-regenerative coil being located on the other side of said oscillation circuit coil, said regenerative coil and anti-regenerative coil being connected together in series with the plate and cathode of said electron discharge device.

WOLFGANG KAUTTER.